(12) United States Patent
Ris

(10) Patent No.: US 8,863,686 B2
(45) Date of Patent: Oct. 21, 2014

(54) FLUID BED APPARATUS FOR COATING SOLID PARTICLES

(75) Inventor: Jürg Paul Ris, Birsfelden (CH)

(73) Assignee: GEA Pharma Systems AG, Bubendorf (CH)

( * ) Notice: Subject to any disclaimer, the term of this patent is extended or adjusted under 35 U.S.C. 154(b) by 817 days.

(21) Appl. No.: 12/667,586

(22) PCT Filed: Jul. 6, 2007

(86) PCT No.: PCT/IB2007/052664
§ 371 (c)(1),
(2), (4) Date: Feb. 1, 2010

(87) PCT Pub. No.: WO2009/007788
PCT Pub. Date: Jan. 15, 2009

(65) Prior Publication Data
US 2010/0126413 A1 May 27, 2010

(51) Int. Cl.
*B05C 19/02* (2006.01)
*B01J 2/00* (2006.01)
*B01J 8/22* (2006.01)
*B01J 2/16* (2006.01)

(52) U.S. Cl.
CPC .. *B01J 2/006* (2013.01); *B01J 8/22* (2013.01); *B05C 19/02* (2013.01); *Y10S 118/05* (2013.01); *B01J 2/16* (2013.01)
USPC ...................................... 118/303; 118/DIG. 5

(58) Field of Classification Search
CPC ................ B01J 2/006; B01J 2/16; B01J 8/22; B05C 19/02; Y10S 118/05
USPC ............... 239/424, 425.5; 422/140, 143, 145, 422/146, 292, 305, 306; 118/19, 20, 24, 118/303, DIG. 5
See application file for complete search history.

(56) References Cited

U.S. PATENT DOCUMENTS

| | | | | |
|---|---|---|---|---|
| 3,152,005 A | * | 10/1964 | Tuttle | 427/213 |
| 3,306,760 A | * | 2/1967 | Zirngibl et al. | 106/437 |
| 4,097,366 A | * | 6/1978 | Tanaka et al. | 208/127 |
| 6,911,087 B2 | * | 6/2005 | Jones et al. | 118/303 |

FOREIGN PATENT DOCUMENTS

| | | |
|---|---|---|
| DE | 38 06 537 A1 | 9/1989 |
| DE | 197 09 589 A1 | 9/1998 |
| EP | 0 507 038 A1 | 10/1992 |
| EP | 0 711 593 A1 | 5/1996 |
| WO | 93/08923 A1 | 5/1993 |
| WO | 95/20432 A1 | 8/1995 |
| WO | 01/37980 A2 | 5/2001 |
| WO | 2006/067546 A1 | 6/2006 |
| WO | WO2006/111161 * | 10/2006 |

* cited by examiner

*Primary Examiner* — Laura Edwards
(74) *Attorney, Agent, or Firm* — Sughrue Mion, PLLC

(57) ABSTRACT

A fluid bed apparatus for coating solid particles. The apparatus includes a housing having upwardly extending walls surrounding a perforated base plate, a nozzle for atomizing a coating liquid, the nozzle being provided in the upwardly extending walls, and a device for providing fluidisation gas through the perforations of the base plate for the maintenance of a fluidised layer. The coating liquid nozzle is provided in a channel for co-current introduction of a dispersion gas, the channel debouching into the fluid bed through an orifice having a radius of 5 mm or more. The apparatus provides for the production of particles having smooth surfaces, high yield and a low tendency to form agglomerates.

16 Claims, 5 Drawing Sheets

FLUID BED APPARATUS FOR COATING SOLID PARTICLES

FIELD OF THE INVENTION

The present invention relates to the technical field of coated particles. In particular, the present invention relates to a fluid bed apparatus for coating solid particles and to a method of preparing such particles. The particles prepared in accordance with the invention have a low tendency to form agglomerates and are produced in high yield.

BACKGROUND OF THE INVENTION AND PRIOR ART

Coating of particulate materials is applied within various industries. Thus, for instance, in the pharmaceutical industry drug-containing tablets and pellets are provided with a coating. Thereby it may be achieved that the active drug is released delayed after administration. This makes it possible to have the active substance released in specific areas of the intestine or to achieve a prolonged release of the active substance.

In the detergent industry an enzyme layer may be provided on a carrying core of extender, which layer is protected against oxidation and attrition by a coating. Also fertilizers, plant protecting agents, and several other chemical products are coated. I.e. this invention is relevant for a variety of industrial sectors, e.g. pharmaceutical, food, dairy, chemical, and ingredient.

Special plants and apparatuses have been developed for coating purposes. One embodiment of these prior art apparatuses comprises a cylindrical or conical reaction chamber having a perforated base plate and a spray nozzle in the top of the reaction chamber. By means of air blown through the base plate a fluidized layer of particles is maintained on said plate and the particles are wetted by the coating liquid which is atomized through the spray nozzle. To achieve the desired degree of encapsulation, uniformity and thickness of the coating layer it is necessary to circulate the batch of particles to be coated for a period between minutes and several hours. This type of apparatus has the drawback that the production capacity is small, and agglomeration of the particles is often experienced.

In an improved version of such apparatus (confer for instance WO93/08923) important constructive amendments have been made. The spray nozzle is placed in the centre of the base plate, and spraying coating liquid upwards in the direction of the main streams. Around the spray nozzle the base plate may have an annular area of a higher perforation due to several larger apertures placed close to each other.

The area more distant from the nozzle may be perforated only to a minor degree; it has less and smaller apertures. Above the spray nozzle a vertical Wurster tube is mounted in such a way that a passage remains between the end of the pipe and the base plate. The diameter of the Wurster tube may correspond to the diameter of the area having more pronounced perforation.

Thereby an annular down-flow bed is formed in the reaction chamber between the wall of the reaction chamber and the Wurster tube, and a coating zone is formed in the Wurster tube. The outer annular portion of the base plate is the bottom of the down-flow bed. Due to the only moderate perforation in the outer annular area, the amount of air penetrating the base plate in this section is smaller than the one passing through the interior portion below the coating pipe. Therefore, the column of particles which collects in the down-flow bed zone is only aereated by the weaker air-stream coming from below. On the contrary the stronger stream of air entering the coating pipe carries the particles coming from the down-flow bed upwards through the cloud of atomized droplets.

To reduce the risk for blocking an apparatus has been developed having no coating pipe but a special spray nozzle (cf. EP-A-563402). By means of pressurized air the material to be coated is blown out from the centre of the spray nozzle. Concentric in relation to the central opening of the nozzle is provided an annular nozzle slot for delivering the coating liquid and pressurized air in an inward direction. This design substantially removes the risk for blocking and sticking of the particles to the inner wall of the reaction chamber. However, the capacity and product quality is still far from satisfactory. Besides, this apparatus is only suitable for treating a limited range of products.

WO95/20432 (Aeromatic-Fielder AG) discloses an apparatus for coating discrete solid particles in a coating unit. Each coating unit comprises an upwardly directed nozzle placed in the bottom, an annular opening around the nozzle, a vertical Wurster tube, above the opening but spaced therefrom, and gas guiding walls below the annular opening for accelerating a gas stream flowing towards said opening. Between the guiding walls means are arranged for imparting a swirling flow to said gas stream. Thereby the particles are coated while being conveyed in a swirling gas flow. While the coating quality and the ease of operation are improved, room for improvement as to further minimize the risk of agglomeration and to increase the yield is still possible.

Apparatuses having a nozzle positioned in the side wall of the fluid bed have been suggested in DE 38 06 537 and DE 197 09 589. DE 197 09 589 relates to a fluid bed in which the spray nozzles extend into the fluid bed chamber. DE 38 06 537 discloses a fluidised-bed apparatus having a three-fluid nozzle arranged in the side wall of a fluid bed. The third fluid is a pressurized gas liberated around a two-fluid nozzle through a small annular slot. The latter technology has the drawback that the attrition is high, which results in a low yield.

The present invention is directed to the technical aim of providing an apparatus and a process suitable for preparing coated particles having a smooth surface and a low tendency to form agglomerates, i.e. a high degree of single coated particles. A further object of the present invention is to provide a process which results in a high yield.

BRIEF DISCLOSURE OF THE INVENTION

The present invention relates to a fluid bed apparatus for coating solid particles, comprising a housing having upwardly extending walls surrounding a perforated base plate, a coating nozzle for atomizing a coating liquid, said nozzle being provided in the upwardly extending walls, and means for providing fluidisation gas through the perforations of the base plate for the maintenance of a fluidised layer, wherein the coating nozzle is provided in a channel for co-current introduction of a dispersion gas, said channel debouching into the fluid bed through an orifice having a radius of 5 mm or more.

Without it is desired to be bound by a particular theory it is presently believed that the dispersion gas disperses the particles immediately in front of the nozzle tip. Thus, as no fluidised particles are present close to the tip, the spray pattern of the coating fluid is allowed to evolve before the droplets collides with the fluidised particles. The gentle and even spraying of the particles due to the room created by the dispersing gas and also due to the movement pattern in such fully fluidized bed results in less agglomeration. Furthermore, the particles to be coated tend not to be broken during the treatment because the low pressure dispersion gas does not create substantial attrition. The absence of substantial attrition leads to a high yield.

The pressure of the dispersion gas must be higher than the gas pressure in the fluidisation chamber for the desired effect to take place. At a constant pressure of the dispersion gas in the channel, the radius of the orifice is decisive for the amount of dispersion gas to enter the fluidisation chamber per time unit. The radius of the orifice is preferably 10 mm or more. In a preferred aspect, the radius of the orifice is in the range of 15 to 250 mm. Compared to the nozzle tip radius, the orifice radius to nozzle tip radius is suitably 2:1 to 100:1.

The nozzle atomising the coating liquid is generally a conventional nozzle known in the art. Thus, the nozzle may be a pressure nozzle, a two-fluid nozzle, or a three-fluid nozzle. As good results have been obtained using a two-fluid nozzle, this type of nozzle is currently preferred. A two-fluid nozzle comprises a first liquid, i.e. the coating liquid, which is atomized by a second pressurized liquid, i.e. pressurized air.

The tip of the nozzle may be in line with the wall of the fluid bed, it may be within the fluid bed or retracted in the channel. Experiments have shown that the spray pattern is best developed when the nozzle tip is positioned retracted in the channel relative to orifice. It is presently believed that the dispersion gas assists in the distribution of the droplets prior to the collision with the fluidised particles. In this way a particle free or deprived space is created in front of the nozzle tip avoiding or diminishing close contact between the fast ejected droplets in front of the tip and the fluidised particles. In a preferred aspect of the invention, the nozzle tip is retracted 5 to 60 mm relative to orifice.

Depending on the design of the fluid bed apparatus of the invention, one two, three or more nozzles for spraying coating liquid can be used. To obtain an effective coating process at least two nozzles may be used. The nozzles are preferable symmetrically distributed in the walls surrounding the base plate to prevent interaction between the spray patterns of the individual nozzles.

The nozzles may be provided in the walls of the fluid bed by any suitable method, ie by drilling a hole in the walls and subsequent mounting of the channel. However, since the majority of fluid bed apparatuses in use have peepholes through which it is possible visually to inspect the fluidisation process, it is preferred to install the dispersion gas channel and the coating nozzle instead of the glass of the peephole. In this way a minimum of adaptation is necessary and it is not required to exchange the equipment entirely for using the present invention.

The one or more nozzles may be fixed in a certain position or may be easy adaptable to a certain extent in one, two or three dimensions. In a certain embodiment the nozzle is displaceable in the vertical or horizontal plane. In addition or in the alternative, the nozzle may be turnable in the vertical or horizontal plane. For certain applications it may be appropriate to spray in a predetermined direction in order to control the flow of particles in the fluid bed. In the horizontal plane, the one or more nozzles may be displaceable or turnable from a direction parallel to the tangent of the fluid bed walls to the reverse direction. In a suitable embodiment, the nozzle points towards the centre of the fluid bed or in a direction up to 60 degrees on either side in the horizontal plane. In the vertical plane the angle between the nozzle and the horizontal plane is suitably −45 to 85 degrees. Preferably, the angle to horizontal is 0 to 45 degrees, ie the nozzle(s) is/are spraying upwards into the fluidised layer. If more than a single nozzle is used, they may be used in concert in order to obtain a certain flow pattern of the fluidised particles.

Below the perforated base plate a plenum is normally positioned. The plenum distributes the fluidisation gas to the perforated plate. Due to the pressure drop over the perforated plate, the plenum pressure is higher than the pressure in the fluidisation chamber. In a suitable embodiment of the present invention, the dispersion gas is received from the plenum. The slightly higher pressure of the dispersion gas ensures that the dispersion gas gently will flow into the fluidisation chamber. The gentle flow results in a controlled blowing of the fluidised particles so as to create a space virtually free of particles in front of the nozzle tip. In the alternative the dispersion gas is fed from a separate unit comprising e.g. a fan, a filter and, optionally, a heater. A separate unit adds to the total expenses, however, also allows for a more accurate adjustment of the pressure of the dispersion gas. A heater can be included in the separate device since it is desirable to have the possibility of heating the dispersion gas before it enters the fluidisation chamber. The radius of the orifice may be lesser than, higher than, or similar to the radius of the channel conveying the dispersion gas. In a prefer embodiment, the orifice radius is lesser than the channel radius to obtain a focussed and accelerated dispersion gas flow around the nozzle tip. A well controlled flow of the dispersion may be obtained when the transition between the channel and the orifice has a conical form.

In certain applications of the present invention it may be desirable to obtain a swirling of the dispersion gas. The swirling may be obtained by providing swirling means on the orifice, the transition, or in a suitable part of the dispersion gas channel. A swirling of the dispersion gas may assist in the formation of a desired spray pattern or influence the fluidised particles in a certain direction.

The gasses leaving the fluid bed is usually filtered to remove fine particles entrained by the fluidisation gas. The filter may be positioned external to the housing of the fluidisation apparatus and/or the filter may be positioned internally in the housing. In case the filter is positioned inside the housing in the upper part thereof, the fine particles retained by the filter may periodically be released from the filter and treated again by the apparatus of the present invention.

The upwardly extending walls of the fluid bed apparatus may be vertical or slightly inclined. In a preferred aspect of the present invention the upwardly extending walls forms a downwardly tapering cone. The coating nozzle(s) is/are generally positioned at a height above the perforated plate in which virtually the entire amount of droplets formed by atomizing the coating fluid is collided with the fluidised particles, ie. the droplets in the spray are preferably not collided with the perforated plate or ejected above the fluidised layer.

The present invention also relate to a method of preparing coated particles. The method comprises the steps of:

providing in a chamber a fluidised layer of particles to be coated, spraying the fluidised particles with a coating liquid injected into the fluidised particles co-currently with a dispersion gas, wherein the pressure in the chamber to dispersion gas pressure is 1:1.001 to 1:2, and drying the coating liquid sprayed on the particles.

The coating liquid generally comprises a solvent and a certain amount of dry matter. To reduce the amount of solvent needed to be evaporated to form the coat, the amount of solvent typically is kept at a low level. Suitable concentrations of the dry matter are between 5 and 40 percent by weight.

The pressure of the dispersion gas is higher than the pressure in the chamber to allow for a flow co-current with the sprayed droplets. The pressure of the dispersion gas must not, however, be too high because of attrition and irregular surface. Therefore high pressure gas, ie. having a pressure of 2 bar absolute or above are generally to be avoided. In a suitable embodiment, the pressure of the dispersion gas is in the range of 0.6 to 1.2 bar absolute, preferably the pressure is 0.7 to 0.99 bar absolute.

The pressure in the fluidisation chamber may be below or above atmospheric pressure. To ease the service of the fluid bed apparatus during operation, it may be desired to have a pressure slightly below ambient pressure. A slightly underpressure allow for eg. exchange of a nozzle without risking that the fluidised particles escape the fluidisation chamber. Suitably, the pressure in the fluidisation chamber is between 0.6 and 0.99 bar absolute. The relationship of the pressure of the chamber to the dispersion gas is preferably 1:1.01 to 1:1.5.

The present invention may be used for coating a variety of particle sizes. Examples of suitable particle sizes include particles between 50 μm and 10 mm. In a certain aspect, the fluidised particles to be coated comprise a pharmaceutical active compound. Coated pharmaceutical particles may be used for retarding the release of the pharmaceutically active compound or to preserve it from release in the stomach (enteric coating).

DETAILED DESCRIPTION OF THE DRAWINGS

The fluid bed apparatus of the invention may be of the batch or continuous type. To illustrate the invention a batch fluid bed type is used, however, the apparatus can be adapted to a continuous process, e.g. as described in WO 2006/067546 (Collette NV). In a continuous type fluid bed the product typically overflows an adjustable weir plate and is discharged continuously through a rotary air lock or a similar device.

The fluid bed serves in a certain embodiment the dual purpose of drying and coating the particles. The drying of the particles operates under the principle of direct drying where direct contact between a heated gas/air and the product occur to effect heat transfer. Usually, however, the core to be coated is substantially dry at the beginning of the process and the drying capacity is mainly used for evaporating the fluid component of the liquid coating.

Figure 1:
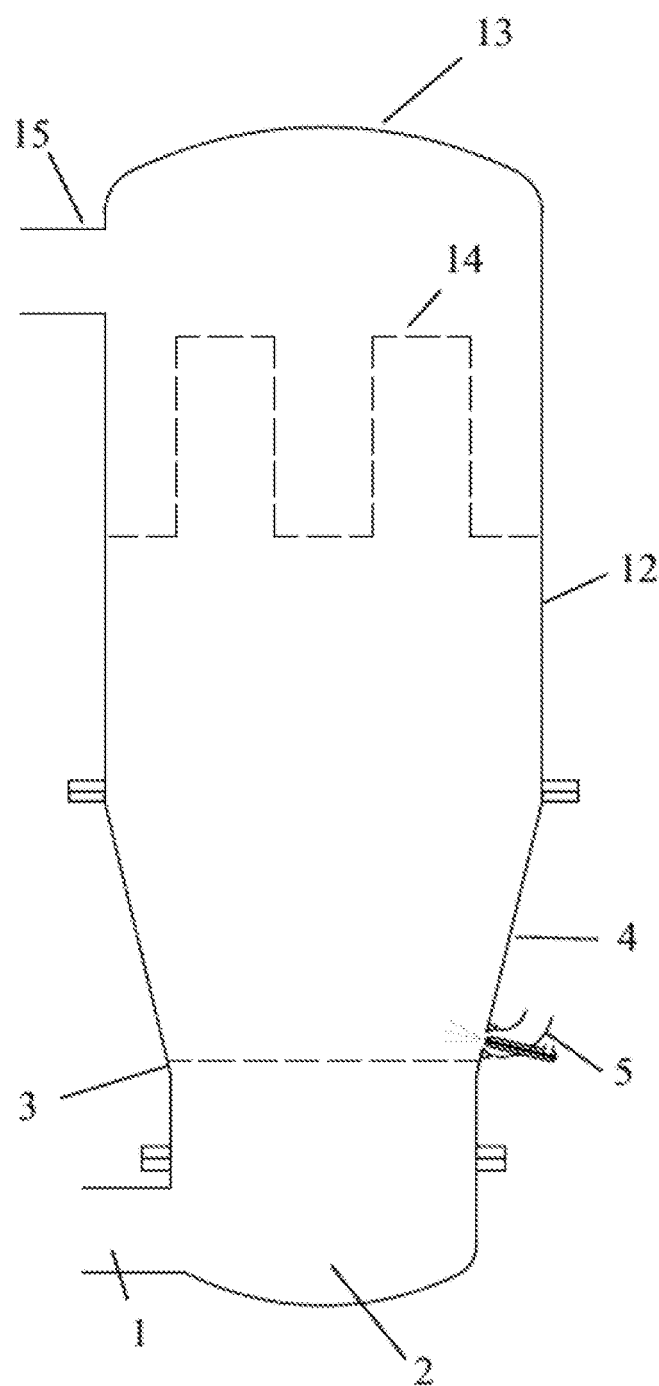
FIG. 1 shows schematically a fluid bed for coating solid particles.

A blower and a heater are generally connected to the lower part of the apparatus and induce a fluidizing gas stream. Alternatively, a suction fan is connected to the upper part of the apparatus housing and a heater is connected to the inlet. Referring to FIG. 1, the gas stream enters the apparatus at the inlet 1 and is received in the plenum 2. The gas is distributed over the perforated base plate 3 and fluidises the particles to be coated and optionally dried. The distribution may be adjusted so as to obtain an even fluidisation of particles or alternatively certain parts of the fluid bed may be favoured as far as the amount of fluidisation gas is concerned. In some embodiments of the invention the geometry of the perforations in the perforated base plate are formed to cause the particles to move in a certain direction. A NON-SIFTING GILL PLATE™ according to EP 507038 B1 is particularly preferred for some applications of the present invention. Thus, the content of EP 507 038 is included herein in its entirety.

The velocity of the fluidisation gas may be adjusted by means of a damper to obtain the particles in a suspension state. The solids in this state are said to be fluidized and the resultant mixture of solids and gas/air behaves like a liquid. This state is termed as "fluid state". It is within the ability of the person skilled in the art to select the specific flow velocity to obtain fluidised particles. Generally, the flow velocity has to be selected from a certain range, which is dependent upon particle size, specific gravity and other properties of the material. In stead of using a perforated plate, a rotary disc having an annular space to the chamber wall may be used to create a pseudo-fluidizing state in the chamber, but a genuine fluid bed as described is preferred.

The perforated plate is circumscribed by a slightly downwardly tapered wall 4. In the wall a channel 5 is provided. The channel 5 is connected to a not shown source of low pressure air. Typically, the pressure of the gas in the channel is in range of 0.6 to 1.2 bar absolute, depending on the pressure in the fluidisation chamber. For the process to be operable it is required that the pressure of the dispersion gas is slightly above the pressure in the fluidisation chamber.

Figure 2:
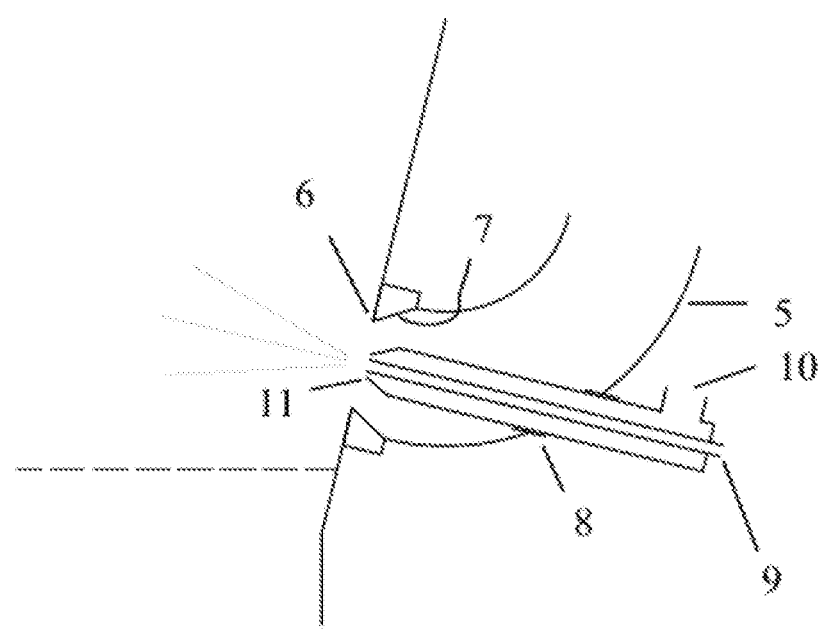
FIG. 2 depicts a detail of the nozzle and the surrounding areas.

The channel forms an orifice 6 when engaged with the wall 4. As shown in greater detail in FIG. 2, the radius of the orifice is lesser than the radius of the dispersion gas channel. Where the dispersion gas channel meets the wall 4 a transition 7 is provided. The transition has a cone form concentrating the dispersion gas prior to the entry into the fluidisation chamber.

Inside the dispersion gas channel 5 a coating nozzle 8 is centrally provided. The coating nozzle shown is a two fluid nozzle, in which the coating liquid enters the pipe 9 and pressurized air enters the inlet 10. At the tip 11 the pressure drop atomizes the coating fluid and droplets are formed. The atomizing air is typically provided at a pressure of 2 to 5 bar.

The downwardly tapering walls 4 extends into a cylindrical section 12, which at the top is closed by an end section 13. Above the fluidised layer and in the cylindrical section a filter 14 is provided. The filter retains fine particles in the chamber. Usually, the filter is of the bag filter type. Different bag filter materials have different ability to separate particles from gas. There are filter materials with big mesh which separate only the big particles. The small particles penetrate through the mesh. Other filter materials separate also the fine particles. Bag filters may be provided with means allowing intermittent release of fine particles entrapped in the pores of the filter.

The spent fluidisation gas leaves the chamber at outlet 15. The spent fluidisation gas may be post-treated in an external filtering device before it is exhausted to atmosphere.

Figure 3:
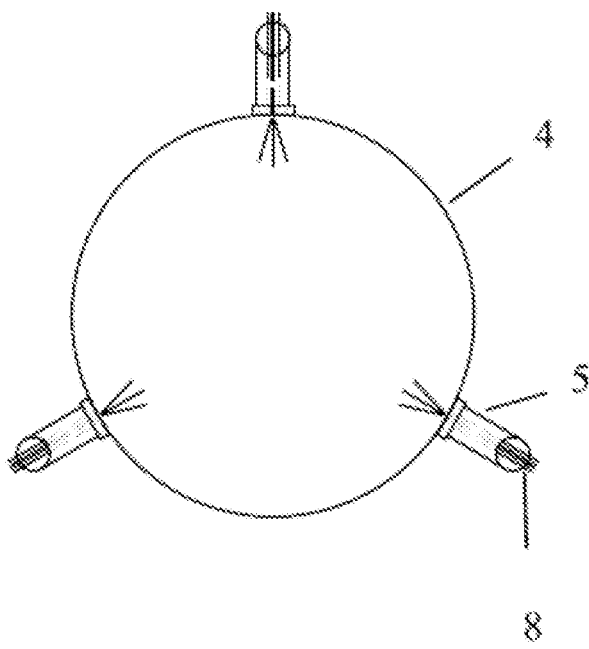
FIG. 3 shows a horizontally cross-section of the fluid bed shown in FIG. 1.

FIG. 3 discloses an embodiment in which three coating nozzles are provided symmetrically in the walls circumscribing the fluid bed. When more than a single coating nozzle is provided, they are preferably symmetrically distributed at the perimeter of the walls.

Figure 4:
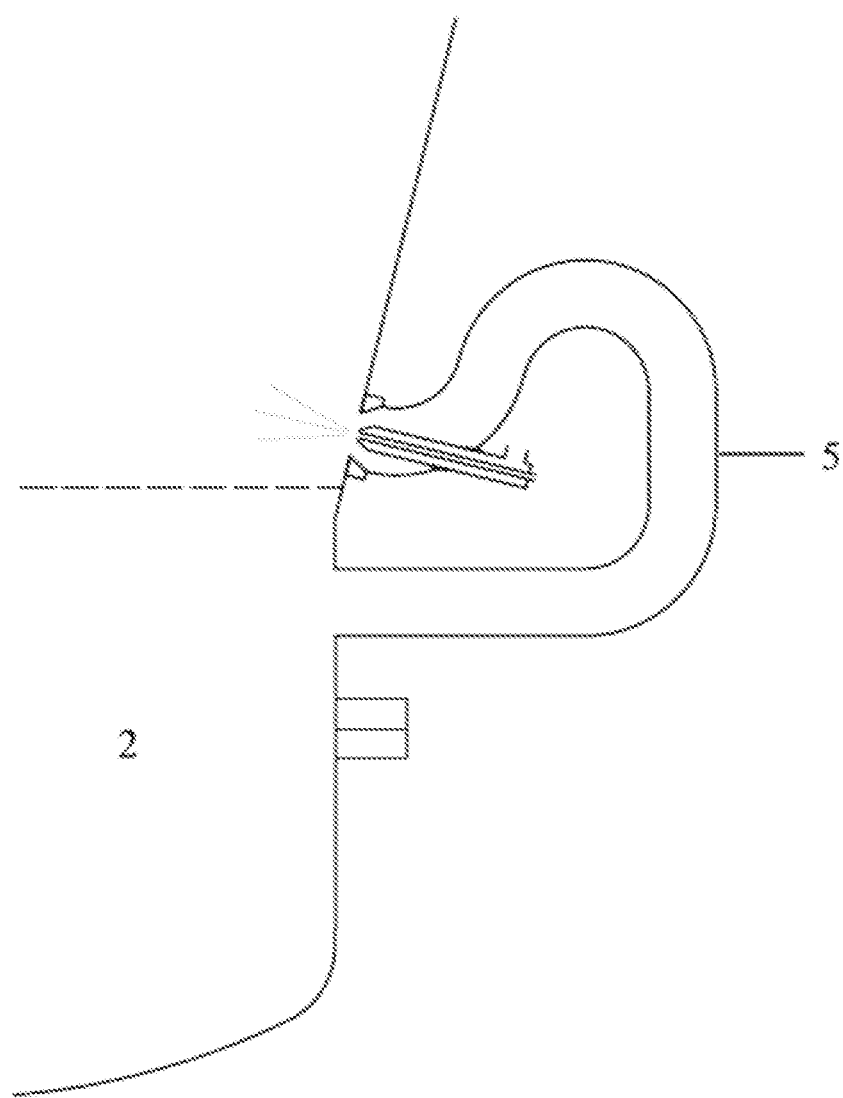
FIG. 4 shows an embodiment in which the dispersion gas is received from the plenum.

FIG. 4 shows an embodiment in which the dispersion gas is received from the plenum 2. Due to the pressure drop over the perforated plate 3 the pressure in the plenum is higher than the pressure in the fluidisation chamber. The dispersion gas channel 5 may conduit the dispersion gas in a loop circumvention the perforated plate as shown. The advantage of using the embodiment shown in FIG. 4 is that only a single gas supply system is required. However, the flexibility is limited.

Figure 5:
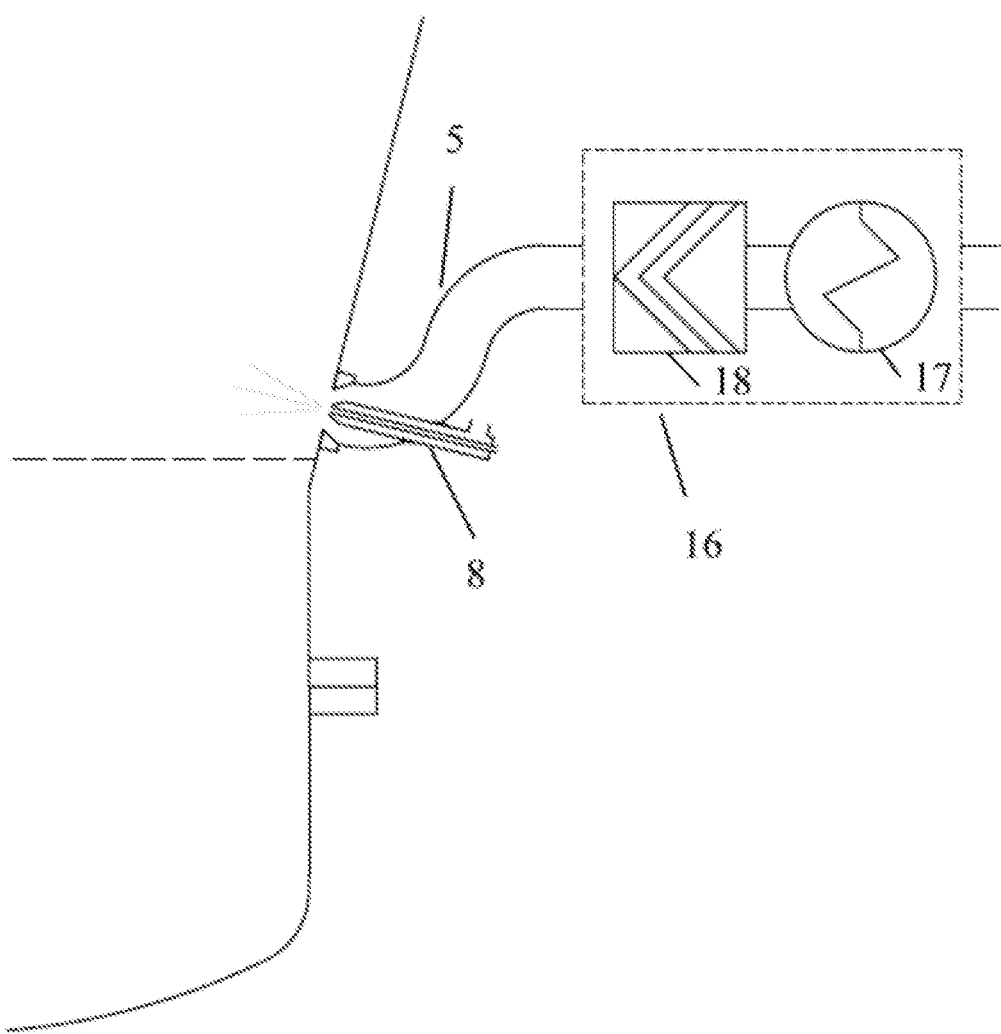
FIG. 5 depicts an embodiment in which the dispersion gas is received from a separate air introduction system comprising a heater as well as a blower.

FIG. 5 discloses an embodiment in which a separate gas supply system 16 is provided. The gas supply system includes a heater 17 and a fan 18. The separate supply system allows for a fully control of the dispersion gas velocity and the temperature thereof.

The invention is further illustrated by means of the following examples.

EXAMPLES

Example 1

Protocol:

A fluid bed was provided with a fluidisation gas flow of 1500 $m^3$/h and loaded with 50 kg of sugar pellets. The inlet temperature of the fluidisation gas was 70° C.

In the three different arrangements described below 3 two-fluid nozzles were spraying 20 kg of 10% aqueous HPMC solution at a spray rate of 150 g/min for each nozzle. The atomizing air pressure of the nozzles was 3 bar.

Test Arrangement 1:

In a first test arrangement a dispersion gas channel was provided around each of the two fluid nozzles. The diameter of the orifice of this channel was 50 mm. A schematical illustration is shown on FIG. 1 and FIG. 4. The pressure in the fluidisation chamber 4 was 0.94 bar absolute and in the lower plenum 2 0.97 bar absolute.

The yield was 51.64 kg (99.3%)

The surface was smooth and homogeneous.

Test Arrangement 2:

A dispersion gas channel was provided around each of the two fluid nozzles. The diameter of the orifice was 0.3 mm and the pressure was increased to 3 bar.

The yield was 37.9 kg (72.9%)

The surface was rough and inhomogeneous. Damaged coating film was visual under the microscope.

Test Arrangement 3:

The set of two fluid nozzles were provided in the fluid bed without an additional air channel around the two fluid nozzles.

The yield was 50.4 kg (96.9%)

The surface was uneven. There was damaged coating film visual under the microscope.

Conclusion:

The experiment illustrates that arrangement 1 creates the smoothest particles with a regular even lining of the sugar pellets. Moreover, the yield of arrangement 1 is higher then the yield of arrangement 2 and 3. Besides the uniform coating, the coated particles were evaluated as having a high integrity.

Example 2

A conventional fluid bed apparatus was adapted to the present invention by mounting three dispersion channels symmetrically in the walls surrounding the fluid bed. The dispersion channels were provided in preexisting peepholes. In each of the dispersion channels a two-fluid spray nozzle was provided having the tip retracted 21 mm from the inner wall of the fluid bed. The orifice had a diameter of 50 mm and the channel diameter was 72 mm. The transition between the dispersion gas channel and the fluid bed formed a cone.

In the fluid bed 50 kg non pareilles sugar pellets having a size of 500-600 μm was initially fluidized. The pressure of the fluidisation gas was adjusted so as to obtain a pressure of 93,500 Pa (0.927 bar) in the fluidisation chamber. The flow of the process air was 1400 $m^3$/h and the temperature was set to 68° C.

The composition of the coating fluid was as follows:

| | |
|---|---|
| Purified water | 44.000 kg |
| HPMC 3 cps | 5.000 kg |
| PVP K17 | 0.500 kg |
| Chlorpheniramine | 0.500 kg |

Each of the two-fluid spray nozzles was continuously fed with a coating fluid at a rate of 106 g/min. The coating liquid was sprayed using an atomizing air pressure of 3.5 bar. The flow of dispersion gas was adjusted to obtain a pressure of 96000 Pa (0.95 bar), i.e. a chamber pressure to dispersion gas pressure of 1:1.027. The total spray time was about 150 min.

The total amount of coated particles obtained by the process was 55.35 g, i.e. only 0.65 kg was lost. In prior art apparatuses the loss is typically 1 to 1.5 kg for this product. The amount of agglomerates measured by sieving analysis was 1.0%. In prior art apparatuses the amount of agglomerates is typically 1.5 to 4% for this product.

The invention claimed is:

1. A fluid bed apparatus for coating solid particles, comprising a housing having upwardly extending walls surrounding a perforated base plate;

means for providing fluidisation gas through perforations of the base plate for the maintenance of a fluidised layer of particles in the housing;

a displaceable coating nozzle for pressurized atomization of coating liquid, said coating nozzle being provided in at least one of the upwardly extending walls in a channel, the coating nozzle and channel providing co-current introduction of a dispersion gas and coating liquid droplets, the channel debouching into the housing through an orifice having a radius of 5 mm or more via a transition area concentrating gas prior to entry into the fluidised layer, and wherein the coating nozzle is retractable within the channel relative to the orifice to provide dispersion gas assistance in distribution of coating liquid droplets prior to exiting the channel followed by collision with fluidised particles in the housing.

2. The fluid bed apparatus according to claim 1, wherein the orifice has a radius of 10 mm or more.

3. The fluid bed apparatus according to claim 1, wherein the radius of the orifice is in the range of 15 to 250 mm.

4. The fluid bed apparatus according to claim 1, wherein the nozzle tip is retracted 5 to 60 mm.

5. The fluid bed apparatus according to claim 1, wherein two or more nozzles are provided in the upwardly extending walls.

6. The fluid bed apparatus according to claim 1, wherein the channel and the coating liquid nozzle are provided in a pre-existing peephole.

7. The fluid bed apparatus according to claim 1, wherein the nozzle is displaceable in the vertical or horizontal plane.

8. The fluid bed apparatus according to claim 1, wherein the nozzle is turnable in the vertical or horizontal plane.

9. The fluid bed apparatus according to claim 1, wherein the dispersion gas is received from a plenum below the perforated plate.

10. The fluid bed apparatus according to claim 1, wherein the dispersion gas is fed from a separate unit comprising a fan and a heater.

11. The fluid bed apparatus according to claim 1, wherein the radius of the orifice is lesser than the radius of the channel.

12. The fluid bed apparatus according to claim 1, wherein the transition area between the channel and the orifice has a conical form.

13. The fluid bed apparatus according to claim 1, wherein swirl means are used in the channel or at the orifice.

14. The fluid bed apparatus according to claim 1, wherein the housing comprises internal filters retaining particles in the housing.

15. The fluid bed apparatus according to claim 1, wherein the perforated base plate covers substantially the entire area surrounded by the upwardly extending walls.

16. The fluid bed apparatus according to claim 1, wherein the nozzle for pressurized atomization of coating liquid is selected from the group consisting of pressure nozzle, two-fluid nozzle, and three-fluid nozzle.

* * * * *